United States Patent [19]

Gray

[11] 4,334,801
[45] Jun. 15, 1982

[54] METHOD AND APPARATUS FOR COVERING A PIPELINE

[75] Inventor: Lew T. Gray, Greenville, S.C.

[73] Assignee: Phillips Petroleum Company, Bartlesville, Okla.

[21] Appl. No.: 98,422

[22] Filed: Nov. 29, 1979

[51] Int. Cl.³ ............................................. F16L 57/00
[52] U.S. Cl. .................................... 405/157; 405/266
[58] Field of Search ............... 405/179, 154, 157–159, 405/164, 155, 161, 266, 270, 271; 404/2, 4, 75

[56] References Cited

U.S. PATENT DOCUMENTS

| | | | |
|---|---|---|---|
| 2,020,083 | 11/1935 | Schmid | 404/2 |
| 2,148,773 | 2/1939 | Ozias | 404/2 |
| 2,707,984 | 5/1955 | Goff | 405/154 X |
| 2,783,698 | 3/1957 | Bambi | 405/157 X |
| 3,290,804 | 12/1966 | Hanson | 405/157 X |
| 3,664,137 | 5/1972 | Lett | 405/179 X |
| 4,028,902 | 6/1977 | Courson et al. | 405/179 X |
| 4,193,713 | 3/1980 | van Nes | 405/159 |

*Primary Examiner*—Stephen J. Novosad

[57] ABSTRACT

An improved method and apparatus for covering a pipeline wherein a fluid-solid fill mixture is continuously deposited over the pipeline and at least a portion of the fluid is continuously removed from the mixture while simultaneously and continuously forming the solid fill in a predetermined contour over the pipeline. In another aspect, an improved method and apparatus is provided in which the tendencies of erosional forces to uncover a pipeline are reduced by forming a consolidated layer over the exposed surface of the said fill.

29 Claims, 5 Drawing Figures

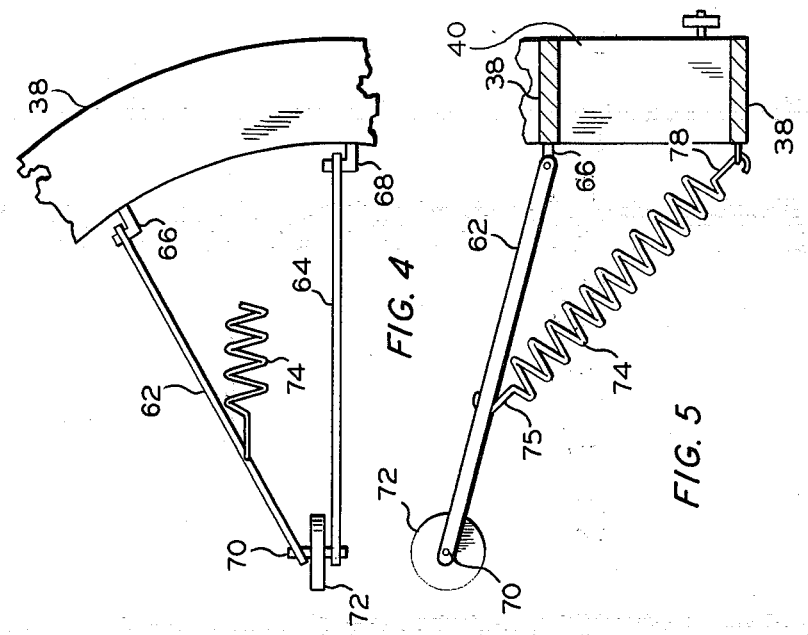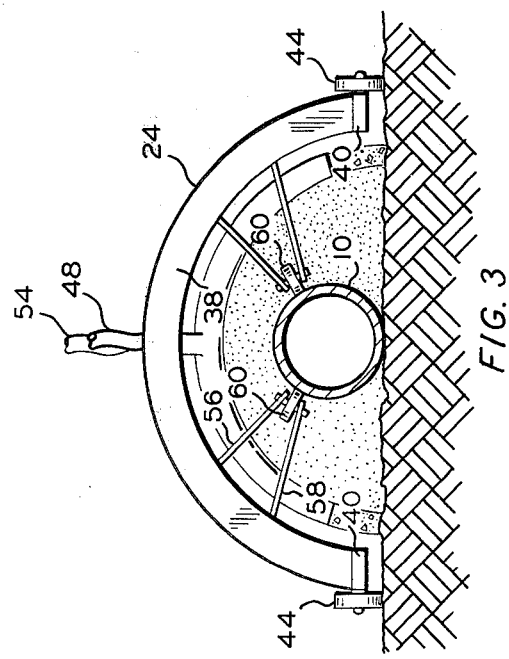

METHOD AND APPARATUS FOR COVERING A PIPELINE

BACKGROUND OF THE INVENTION

The present invention relates to a method and apparatus for covering a pipeline. More particularly, the present invention relates to a method and apparatus for covering a pipeline where conventional trenching and backfilling is uneconomical or difficult.

In conventional techniques for laying a pipeline it is customary to dig a trench, lay the line in the trench, and cover the line by backfilling with the fill material removed from the trench or a solid fill material from another source. In some instances, however, the terrain traversed by the pipeline, the environment in which the line is laid and/or the hardness of the earth in which the line is to be laid, make it difficult or uneconomical to utilize conventional trenching and filling techniques. However, in many cases, governmental regulations require that pipelines be covered by a minimum thickness of material irrespective of the conditions and the problems encountered. In some cases, because of environmental conditions, particularly where it is difficult to place the line in a trench or a trench of the desired depth, the fill material must be mounded over the line. In such cases, erosional forces either tend to uncover the line, at least in some areas, and in some cases even move the line itself from its original location. For example, in some instances, where a line is laid on the bottom of a body of water both of these problems can be encountered. In one instance, where particular soil conditions at the bottom of the body of water prevented proper trenching, government regulations required that the line be covered and, as a result, the line was temporarily covered with sandbags. In this particular instance the anchor of a vessel was at one time inadvertently dragged across the line, causing a break therein, and it was also discovered that the line had moved from its original location at certain locations due to wave action.

It is therefore an object of the present invention to provide an improved method and apparatus for covering a pipeline.

Another object of the present invention is to provide an improved method and apparatus for continuously covering a pipeline.

A further object of the present invention is to provide an improved method and apparatus for covering a pipeline where conventional trenching and filling operations cannot be utilized.

Yet another object of the present invention is to provide an improved method and apparatus for covering a pipeline where conventional trenching and filling operations cannot be carried out, which method can be carried out continuously.

Still another object of the present invention is to provide an improved method and apparatus for covering a pipeline laid at the bottom of a body of water.

A still further object of the present invention is to provide an improved method and apparatus for continuously forming a profiled cover over a pipeline which is at least partially above the surface of the earth.

Yet another object of the present invention is to provide an improved method and apparatus for at least temporarily preventing erosion of a loose fill covering a pipeline.

Another and further object of the present invention is to provide an improved method and apparatus for at least temporarily preventing the erosion of a loose fill covering from a pipeline which is at least partially above the surface of the earth.

These and other objects and advantages of the present invention will be apparent from the following description.

SUMMARY OF THE INVENTION

In accordance with one aspect of the present invention a method and apparatus is provided wherein a fluid-solid fill mixture is deposited over a pipeline and continuously and simultaneously at least a portion of the fluid is removed from the mixture and the solid fill is formed in a predetermined contour over the pipeline. In accordance with another aspect of the present invention, a body of solid fill is formed over a pipeline and immediately thereafter a fluent material adapted to form at least a temporary consolidated layer over the exposed surface of the solid fill is deposited on the exposed surface of the solid fill.

BRIEF DESCRIPTION OF THE DRAWINGS

FIG. 3 is a front view of the disengaging means of FIG. 2.

FIGS. 4 and 5 are front and top views, respectively, of articulated guide means for use on the disengaging means shown in FIGS. 1 through 3.

DESCRIPTION OF THE PREFERRED EMBODIMENTS

Figure 1:
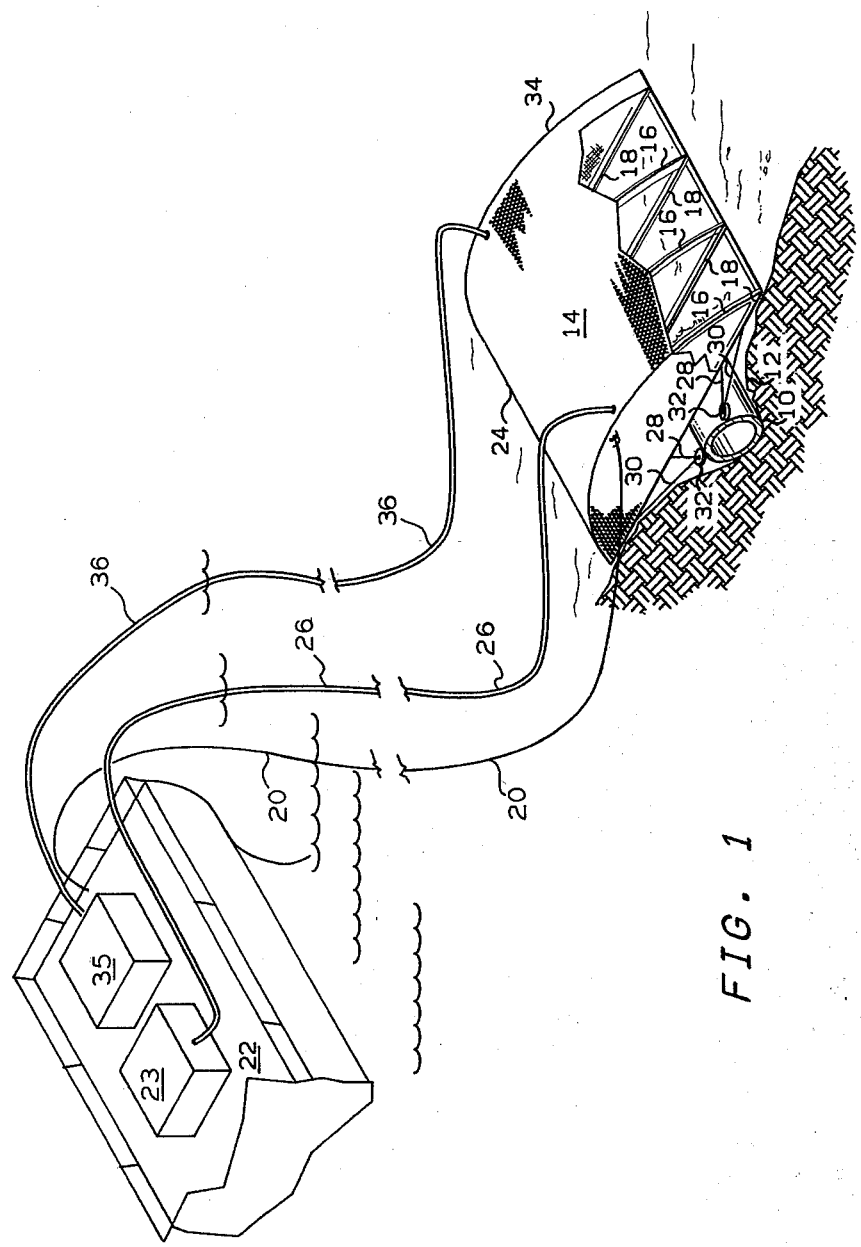
FIG. 1 is a perspective view, partially in section, of one embodiment of the present invention.

In accordance with one aspect of the present invention a pipeline is covered by continuously depositing a fluid-solid fill mixture over the pipeline and continuously and simultaneously removing at least a part of the fluid from the mixture and forming the solid fill in a predetermined contour over the pipeline. This technique is particularly useful when the pipeline is laid at the bottom of a body of water and/or the pipeline is not laid in a trench at the necessary or desirable depth.

The solid fill may be any suitable fill material such as sand, a mixture of sand and gravel, gravel or any other suitable material which can be transported in fluent form. In accordance with a specific embodiment of the present invention the solid fill is in the form of a slurry of the solid fill, preferably sand in water. A sand slurry is preferred since equipment and techniques for forming and pumping such slurries are known and available, particularly in oil field operations where sand slurries are pumped under pressure in the hydraulic fracturing of subsurface formations in oil wells. The slurry is continuously pumped to the pipeline location to thereby deposit the slurry over the line. Where the line is located on the bottom of a body of water the slurry is pumped from a surface vessel through a transport line extending to the locus of the pipeline. As the slurry is being deposited over the pipeline the solid fill will settle from the slurry but it is also necessary to separate at least a portion of the transport fluid from the solid fill and to contour the solid fill over the pipeline to provide an essentially even disposition of the solid fill over the line. As will be more precisely described in the description of the drawings, this can be accomplished by continuously drawing a disengaging means, comprising an open frame, adapted to extend over and above the pipeline and form the loose, solid fill in a predetermined contour over the pipeline, and having a filtering means to simultaneously and continuously separate at least a portion of the carrier fluid from the said fill.

The disengaging means can be provided with its own motive means, either as an integral part thereof or attached by a tow means, for drawing the disengaging means along the pipeline. Where the slurry is being pumped from a surface vessel to a pipeline disposed at the bottom of a body of water, the slurry transporting line is preferably flexible and, with appropriate reinforcement, can be utilized to draw the disengaging means along the pipeline as the surface vessel moves along the surface of the water. A separate tow line from a surface vessel can also be used.

In order to maintain the disengaging means essentially centered over the pipeline, at least one guide means may be provided, adapted to contact the pipe and maintain the disengaging means over the pipe. It is of course obvious that the disengaging means should have sufficient weight to maintain the same in contact with the surface of the earth and prevent its being raised from the surface by the fill material, or water in the case of an underwater operation.

In accordance with another aspect of the present invention, particularly where the line to be covered projects at least partially above the surface of the earth, erosion of loose fill covering the pipeline is prevented by continuously forming a loose, solid fill covering over the pipeline and immediately thereafter depositing over the exposed surface of the fill material a layer of a fluent material adapted to form at least a temporary consolidated layer over such exposed surface.

Where the pipeline is covered by depositing a fluid-solid fill mixture over the line and simultaneously separating at least a portion of the carrier fluid from the solid fill and forming the solid fill in a predetermined contour over the line, as described above, the deposition of the fluent material, which forms a consolidated coating over the fill, is most conveniently accomplished by providing means for depositing the fluent material at the trailing end of the disengaging means.

Fluent materials which may be utilized in accordance with the present invention to provide a temporary or permanent consolidated layer over the fill are also well known in the art, as are techniques for pumping the same. Such fluent materials may be a consolidating material which consolidates the upper layer of the solid fill material or a consolidatable material which itself forms a consolidated layer over the solid fill material. Specifically, in the drilling and completion of oil wells and the like, such fluent materials are utilized as drilling fluids and for permanently or temporarily plugging preselected earth formations or consolidating loose sand formations.

For example, a conventional oil well drilling mud, which usually comprises an aqueous slurry of a clay, may be utilized as a temporary consolidating material. Such materials, when pumped under pressure, at least partially enter the formation to be sealed and set therein to form a temporary seal over the formation to which they are applied. In many cases such a seal will be adequate since no fluid pressures within the body of solid fill will exist. Accordingly, once the clay is deposited under pressure, release of the pressure will not readily affect the integrity of the seal which has been formed.

Oil well formation plugging materials, such as water solutions of sodium silicate and ammonium carbonate, which react with salt water to form a precipitate which adheres to the earth formations, can also be used. Other well known materials utilized in oil well completion operations to exclude water from the well may be utilized. The most convenient and effective material is a hydraulic cement slurry, since such materials are capable of hardening or setting under water.

Suitable embodiments of apparatus for carrying out the method of the present invention will be apparent from the following description when read in conjunction with the drawings.

FIG. 1 is a perspective view of a disengaging means, in accordance with the present invention, in position for use in covering a pipeline disposed at the bottom of a body of water. In accordance with FIG. 1, a pipeline 10 is disposed in a ditch or trench 12 at the bottom of the body of water. The disengaging means of the present invention comprises a body member 14 adapted to be disposed over and above the pipe 10 and to be drawn along the surface of the bottom of the body of water. The body member 14 includes a frame comprising arched struts 16 and cross supports 18. Attached to the front cross support 18 is tow line 20. Tow line 20 may be attached to a suitable motive vehicle moving along the bottom of the body of water, under its own power, or tow line 20 may be attached to surface vessel 22 moving along the surface of the body of water. The frame member is covered with an appropriate filtering material 24, such as a cloth filter or metallic mesh filter, which is adapted to separate a liquid carrier fluid, such as water, from a loose, solid fill material, such as sand. Filtering material 24 is disposed over the top of struts 16 and extends downwardly from the front and rear struts 16 to the front and rear cross members 18. A fluid-solid fill mixture, such as a slurry of sand and water, is pumped from a supply source 23 on surface vessel 22 through transport line 26 to the subsurface location of the pipeline and, specifically, into the interior of the disengaging means and over the pipeline 10. As the slurry is pumped into the interior of the disengaging means, the solid fill material will settle from the slurry. The cross members 18 to the rear of front cross member 18 serve as contouring means for forming a predetermined contour of the settling, solid fill material over the pipeline. Preferably, the disengaging means is of sufficient length to permit essentially complete settling of the solid fill material from the slurry by the time a specific increment of the fill is reached by the rear portion of the disengaging means. The filtering covering 24 permits the carrier fluid to pass out of the disengaging means while preventing any appreciable passage of the solid fill material therethrough. Settling, contouring of the solid fill and removal of the carrier fluid are aided by the disengaging space which will be formed between the top of the body of fill material, essentially at the level of cross members 18, and struts 16. The disengaged carrier fluid can, of course, also pass through the section of filter spanning rear cross support 18 and rear strut 16. Mounted adjacent the front of the disengaging means and forward of the point at which the fluid-solid fill slurry is introduced into the disengaging means is at least one guide means adapted to orient the disengaging means over the pipeline 10. In the embodiment illustrated, two such orienting means are provided which comprise support arms 28 and 30 attached to the frame of the disengaging means and carrying orienting rollers or wheels 32. The orienting wheels 32 rest against the pipeline 10 and maintain the disengaging means essentially centered over the pipeline 10. Mounted at the rear of the disengaging means is a fluent material distributing means 34. Fluent material distributing means 34 is constructed so as to conform to the general contour of the solid fill material disposed over the pipe 10 and, in this case, has an essentially flat bottom. Fluent material distributing means 34 is adapted to spread a fluent material, preferably under pressure, over the exposed surface of the solid fill material, which fluent material is adapted to form an at least temporarily consolidated layer over the exposed surface of the loose fill material. As previously indicated, the preferred fluent material is a hydraulic cement slurry, particularly where the device is to be used at the bottom of a body of water. The fluent material slurry is transported to the distributing means 34 through transport line 36 from a source 35 on the surface vessel 22. Transport lines 26 and 36 are preferably flexible for obvious reasons. In addition, either or both of the two lines, with appropriate reinforcing means therein or therealong, can be utilized to draw the disengaging means along the pipeline as the surface vessel moves along the surface of the water.

Figure 2:
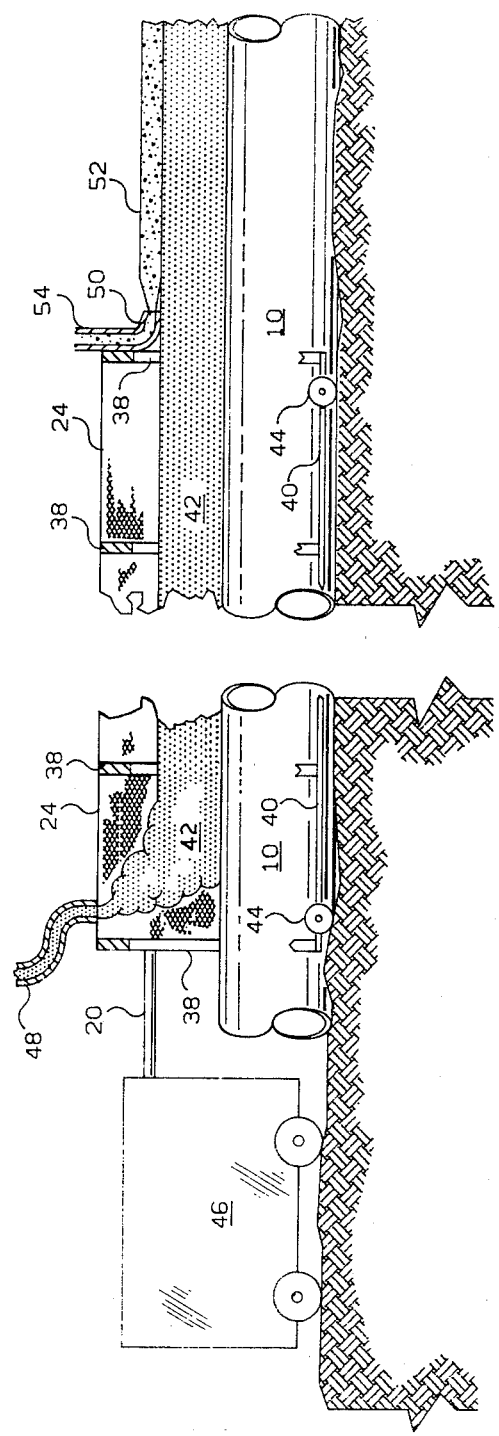
FIG. 2 is a side view, partially in section, of another embodiment of the present invention.

FIG. 2 of the drawings is a sideview, partially in cross-section, illustrating another embodiment of the present invention which can be utilized to cover a pipeline laid along the surface of the earth. In this particular embodiment the disengaging means is formed as an arch or semicylindrical structure to pass over and envelope the surface laid pipeline 10. The frame of the disengaging member in this instance comprises a plurality of spaced apart struts 38 attached on either side to longitudinal support members 40. Strut members 38 are therefore adapted to act as contouring means for forming the solid fill material as an arcuate mound over the pipeline 10. The disengaging means of this embodiment, as well as that of FIG. 1, may be provided with rollers or wheels 44 mounted on the longitudinal supports 40 to aid in the drawing of the disengaging means along the pipeline. Tow line 20 attached to the front of the disengaging means is shown attached to an appropriate self-propelled motive means 46. As previously indicated, the tow vehicle can be built into the front of the disengaging means. Struts 38 act as supports for and are covered by an appropriate filtering means 24. The fluid-solid fill mixture is supplied to the disengaging means through transport line 48. Mounted at the rear of the disengaging means is an arcuate fluent material distributing means 50, which is adapted to distribute a fluent material, such as a cement slurry 52, over the surface of the mound of loose fill material 42. The fluent material is supplied to distributing means 50 through transport line 54.

FIG. 3 is a front-end view of a disengaging means of the character illustrated in FIG. 2. In FIG. 3 corresponding elements of FIG. 2 utilize the same numerical designations. It is believed that FIG. 3 is self-explanatory from the explanation of FIG. 2. However, FIG. 3 shows the guide means comprising support arms 56 and 58 and orienting wheels 60 disposed on either side of the pipeline 10 for centering the disengaging apparatus over the pipeline 10.

Obviously, the guide means may be a stationary guide means or an articulated guide means adapted to be resiliently urged against the pipeline. An embodiment of such an articulated guide means is shown in FIGS. 4 and 5 of the drawings. FIG. 4 is a front view, partially in section, of the articulated guide means while FIG. 5 is a top view, partially in section. In accordance with FIGS. 4 and 5, the guide means include upper and lower arms 62 and 64, respectively. Arms 62 and 64 are pivotally mounted on mounting pins 66 and 68, respectively, which are attached to strut members 38. Mounted in the free ends of arms 62 and 64 is rotatable axle 70. Mounted on axle 70 is orienting wheel 72, which, as previously indicated, is adapted to roll along the pipeline as the disengaging means is drawn along the pipeline. As shown in FIG. 5, the guide means is generally oriented in a rearward direction. However, the free end of the orienting means carrying orienting wheel 72 is urged forwardly by means of spring 74. Obviously spring 74 may be attached to either arm 62 or arm 64 by a simple hook 75 and to a strut 38, forward of the strut carrying arms 62 and 64, by means of a hook 78 or other appropriate mounting element.

While specific techniques, materials and particular structures have been described herein, it is to be understood that these specific recitals are by way of illustration and explanation only and are not to be considered limiting.

I claim:

1. A method for covering a pipeline, comprising:
   (a) continuously depositing a fluid-solid fill mixture over said pipeline; and
   (b) continuously and simultaneously removing at least a portion of said fluid from the thus deposited fluid-solid fill mixture and forming said solid fill in a predetermined contour over said pipeline.

2. A method in accordance with claim 1 wherein the pipeline is located along the bottom of a body of water.

3. A method in accordance with claim 2 wherein the fluid-solid fill mixture is transported from the surface of the body of water to the locus of the pipeline at the bottom of the body of water.

4. A method in accordance with claim 1 wherein the fluid of the fluid-solid fill mixture is water.

5. A method in accordance with claim 1 or 4 wherein the solid fill is sand.

6. A method in accordance with claim 1 wherein the predetermined contour of the solid fill is formed by moving a contouring means continuously along the pipeline.

7. A method in accordance with claim 1 or 6 wherein the fluid is removed from the fluid-solid fill mixture by filtering.

8. A method in accordance with claim 1 wherein one of a fluent consolidating material and a fluent consolidatable material, adapted to form an erosion-resistant layer over the surface of the contoured body of the solid fill, is deposited over the exposed surface of said contoured body of said solid fill immediately following the formation of said contoured body of said solid fill.

9. A method in accordance with claim 8 wherein the pipeline is located along the bottom of a body of water and the fluent material is transported from the surface of said body of water to the locus of said pipeline on the bottom of said body of water.

10. A method in accordance with claim 8 or 9 wherein the fluent material is a cement slurry.

11. Apparatus for covering a pipeline, comprising:
    (a) a frame member adapted to be continuously drawn along the surface of the earth, to extend over and above said pipeline and to continuously form an in-place body of loose, fluid-solid fill into a body of solid fill, having a predetermined cross-sectional contour, over said pipeline; and (b) an extended filter surface means mounted on said frame, covering at least a part of said frame member and adapted to continuously separate at least a portion of said fluid from said fluid-solid fill simultaneously with said formation of said body of solid fill over said pipeline.

12. Apparatus in accordance with claim 11 wherein the part of the frame member on which the filter surface is mounted is arched to extend from one side of the pipeline to the other and said filter surface covers at least said arched part of said frame.

13. Apparatus in accordance with claim 12 wherein the filter surface also covers at least one of at least the upper portion of the leading end of the frame member and at least the upper portion of the trailing end of said frame member.

14. Apparatus in accordance with claim 11 wherein a part of the frame member forms a contouring means adapted to form the body of solid fill having a predetermined cross sectional contour and the part of said frame member on which the filter surface is mounted is spaced above the contour forming part of said frame member to form a carrier fluid-loose solid fill disengaging space between said contour forming part of said frame member and said part of said frame member on which said filter surface is mounted.

15. Apparatus in accordance with claim 11 wherein a guide mean is mounted on the frame member adjacent the leading end of said frame member and is adapted to maintain said frame member essentially centered over the pipeline.

16. Apparatus in accordance with claim 15 wherein the guide means includes articulated arms mounted on the frame member and tension means adapted to resiliantly urge said guide means against the pipeline.

17. Apparatus in accordance with claim 15 wherein the guide means includes contact means adapted to provide rolling contact with the pipeline.

18. Apparatus in accordance with claim 15 wherein the guide means is adapted to contact the pipeline on each side thereof.

19. Apparatus in accordance with claim 11 which includes a means for introducing a mixture of the solid fill in a carrier fluid ahead of the leading end of the frame member, into the interior of the frame member beneath the filtering surface adjacent said leading end of said frame member or both, is operatively connected to said frame member.

20. Apparatus in accordance with claim 19 wherein the means for introducing the mixture of the solid fill in the carrier fluid introduces the mixture into the interior of the frame member.

21. Apparatus in accordance with claim 11 wherein the means for introducing the mixture of the solid fill in the carrier fluid is a conduit means, adapted to transport said mixture of said solid fill material in said carrier fluid from a vessel, adapted to the propelled along surface of a body of water, to a locus of the pipeline on the bottom of said body of water.

22. Apparatus in accordance with claim 21 wherein the frame member is adapted to be drawn along the pipeline by the surface vessel.

23. Apparatus in accordance with claim 11 which includes a self-propelled motive means operatively associated with the frame member and adapted to move along the surface of the earth and draw frame member along the pipeline.

24. Apparatus in accordance with claim 11 which includes a distributing means mounted adjacent the trailing end of the frame member and adapted to deposit at least one of a fluent consolidating material and a fluent consolidatable material, for forming an erosion-resistant layer over the exposed surface of the body of solid fill, on said exposed surface of said body of solid fill.

25. Apparatus in accordance with claim 24 which includes a transport means operatively connected to the distributing means and adapted to transport said fluent material from a surface vessel, adapted to move along the surface of a body of water, to the pipeline locus on the bottom of said body of water.

26. Apparatus in accordance with claim 24 wherein the distributing means is adapted to discharge the fluent material under pressure.

27. A method for covering a pipeline, comprising:
(a) continuously depositing a solid fill over said pipeline; and
(b) depositing one of a fluent consolidating material and a fluent consolidatable material, adapted to form an erosion-resistant layer over the exposed surface of said solid fill, immediately following the deposition of said solid fill over said pipeline;
(c) said depositing of said solid fill and said depositing of one of said fluent consolidating material and said fluent consolidatable material being carried out in a manner to form a contour of predetermined cross-section extending above the general surface of the surrounding terrain.

28. A method in accordance with claim 27 wherein the fluent material is a hydraulic cement slurry.

29. A method in accordance with claim 27 wherein the predetermined cross-section is semicircular.

* * * * *